(12) United States Patent
Foxworth et al.

(10) Patent No.: US 10,642,504 B2
(45) Date of Patent: *May 5, 2020

(54) THERMAL AND POWER MEMORY ACTIONS (71) Applicant: International Business Machines Corporation, Armonk, NY (US)

(72) Inventors: Briana E. Foxworth, Round Rock, TX (US); Saravanan Sethuraman, Bangalore (IN); Kevin M. Mcilvain, Delmar, NY (US); Lucas W. Mulkey, Austin, TX (US); Adam J. McPadden, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,293

(22) Filed: May 28, 2019

(65) Prior Publication Data
US 2019/0310896 A1 Oct. 10, 2019

Related U.S. Application Data (63) Continuation of application No. 15/650,204, filed on Jul. 14, 2017, now Pat. No. 10,394,618.

(51) Int. Cl.
G06F 3/06 (2006.01)
G06F 9/50 (2006.01)
G05D 23/19 (2006.01)
G06F 1/3234 (2019.01)
(Continued)

(52) U.S. Cl.
CPC ........... G06F 3/0614 (2013.01); G05D 23/19 (2013.01); G06F 1/206 (2013.01); G06F 1/3225 (2013.01); G06F 1/3234 (2013.01); G06F 1/3275 (2013.01); G06F 3/0646 (2013.01); G06F 3/0685 (2013.01); G06F 9/5016 (2013.01);
(Continued)

(58) Field of Classification Search
CPC .... G06F 3/0614; G06F 3/0617; G06F 3/0625; G06F 3/0646; G06F 3/0653; G06F 3/0683; G06F 3/0685
See application file for complete search history.

(56) References Cited

U.S. PATENT DOCUMENTS 5,784,328 A 7/1998 Irrinki et al.
6,373,768 B2 4/2002 Woo et al.
6,838,331 B2 1/2005 Klein
(Continued)

OTHER PUBLICATIONS

Anonymous, "Method and System for Regulating Temperature in a Server by Analyzing Thermal Zones in the Server," IP.com at:http://ip.com/IPCOM/000213655, IP.com No. IPCOM000213655D, IP.com Electronic Publication Date: Dec. 29, 2011, 6 pgs.
(Continued)

Primary Examiner — Reginald G Bragdon
Assistant Examiner — Aaron D Ho
(74) Attorney, Agent, or Firm — Alex Harvey (57) ABSTRACT Embodiments of the present disclosure relate to managing volatile and non-volatile memory. A set of volatile memory sensor data may be obtained. A set of non-volatile memory sensor data may be obtained. The set of volatile memory sensor data and the set of non-volatile memory sensor data may be analyzed. A memory condition may be determined to exist based on the analysis. In response to determining that the memory condition exists, one or more memory actions may be issued.

18 Claims, 4 Drawing Sheets (51) Int. Cl.
*G06F 1/20* (2006.01)
*G06F 1/3225* (2019.01)

(52) U.S. Cl.
CPC .......... *G06F 9/5094* (2013.01); *G06F 3/0653* (2013.01); *G06F 3/0683* (2013.01)

(56) References Cited

U.S. PATENT DOCUMENTS

| | | |
|---|---|---|
| 7,512,513 B2 | 3/2009 | Johns et al. |
| 7,549,034 B2 | 6/2009 | Foster, Sr. et al. |
| 8,095,851 B2 | 1/2012 | Diggs et al. |
| 9,355,024 B2 | 5/2016 | Nguyen et al. |
| 9,472,261 B1 | 10/2016 | Chun et al. |
| 9,507,529 B2 | 11/2016 | Danilak et al. |
| 9,529,543 B1 | 12/2016 | Chinnakkonda Vidyapoornachary et al. |
| 9,535,828 B1 | 1/2017 | McKelvie et al. |
| 9,804,796 B1 | 10/2017 | Gwin |
| 9,811,267 B1 | 11/2017 | Yang et al. |
| 9,927,986 B2 | 3/2018 | Hodes et al. |
| 10,198,300 B1 | 2/2019 | Foxworth et al. |
| 2005/0141311 A1 | 6/2005 | Kim et al. |
| 2005/0162962 A1 | 7/2005 | Shirota et al. |
| 2007/0258278 A1 | 11/2007 | Bacha et al. |
| 2010/0202239 A1 | 8/2010 | Moshayedi et al. |
| 2010/0202240 A1 | 8/2010 | Moshayedi et al. |
| 2010/0205349 A1 | 8/2010 | Moshayedi et al. |
| 2010/0205470 A1 | 8/2010 | Moshayedi et al. |
| 2014/0101371 A1 | 4/2014 | Nguyen et al. |
| 2014/0112370 A1 | 4/2014 | Hsu et al. |
| 2015/0089287 A1 | 3/2015 | Jayakumar et al. |
| 2015/0363272 A1 | 12/2015 | Zheng et al. |
| 2016/0118121 A1 | 4/2016 | Kelly et al. |
| 2017/0003881 A1 | 1/2017 | Amidi |
| 2017/0060780 A1 | 3/2017 | Chinnakkonda Vidyapoornachary et al. |
| 2017/0060782 A1 | 3/2017 | Chinnakkonda Vidyapoornachary et al. |
| 2017/0131952 A1 | 5/2017 | Lee et al. |
| 2017/0160936 A1 | 6/2017 | Chinnakkonda Vidyapoornachary et al. |
| 2017/0262344 A1 | 9/2017 | Shaw et al. |
| 2017/0322740 A1 | 11/2017 | Gabryjelski |
| 2018/0052717 A1 | 2/2018 | Chung et al. |
| 2018/0059943 A1 | 3/2018 | Lueker-Boden et al. |
| 2018/0095691 A1 | 4/2018 | Manvar et al. |
| 2019/0018712 A1 | 1/2019 | Foxworth et al. |
| 2019/0018713 A1 | 1/2019 | Foxworth et al. |

OTHER PUBLICATIONS

Anonymous, "Generic Device With Adaptive Thermal Characteristics," http://ip.com/IPCOM/000237088, IP.com No. IPCOM000237088D, IP.com Electronic Publication Date: May 30, 2014, 4 pgs.

Anonymous, "Method and Apparatus for Thermal Mark Management to Avoid System Failures," http://ip.com/IPCOM/000239979, IP.com No. IPCOM000239979D, IP.com Electronic Publication Date: Dec. 18, 2014, 3 pgs.

IBM, "Reduction in DIMM Maximum Power by Restricting High Power Cycles," http://ip.com/IPCOM/000149904, An IP.com Prior Art Database Technical Disclosure, IP.com No. IPCOM000149904D, IP.com Electronic Publication Date: Apr. 12, 2007, 3 pgs.

IBM, "Asymmetric memory throttling in servers," http://ip.com/IPCOM/000184213, IP.com No. IPCOM000184213D, IP.com Electronic Publication Date: Jun. 15, 2009, 5 pgs.

Anonymous, "Data Security in NVDIMM," http://ip.com/IPCOM/000246467, IP.com No. IPCOM000246467D IP.com Electronic Publication Date: Jun. 9, 2016, 6 pgs.

Chinnakkonda Vidyapoornachary et al., "System and Method for Conserving Energy in Non-Volatile Dual Inline Memory Modules," U.S. Appl. No. 15/096,599, filed Apr. 12, 2016.

Kim et al., "A Design Guideline for Volatile STT-RAM with ECC and Scrubbing", 2015 International SoC Design conference (ISOCC), 2015, pp. 29-30.

Kim et al., "Exploration of trade-offs in the design of volatile STT-RAM cache", Journal of Systems Architecture, vol. 71, 2016, pp. 23-31.

Tsao et al., "Distillation: A Light-Weight Data Separation Design to Boost Performance of NVDIMM Main Memory", Embedded and Real-Time Computing Systems and Applications, IEEE 23rd International Conference, 2017, 7 pages.

Goronkin et al., "High-Performance Emerging Solid-State Memory Technologies", MRS Bulletin, Nov. 2004, pp. 805-813.

Kannan et al., "pVM—Persistent Virtual Memory for Efficient Capacity Scaling and Object Storage", Proceedings of the Eleventh European Conference on Computer Systems, ACM, 2016, 16 pages.

IBM, List of Patents or Patent Applications Treated as Related, May 28, 2019, 2 pages.

THERMAL AND POWER MEMORY ACTIONS

BACKGROUND

The present disclosure relates generally to the field of data storage, and more particularly to memory module data storage.

Dual in-line memory modules (hereinafter "DIMMs") may include one or more memory chips (e.g., Dynamic Random Access Memory (DRAM)) for data storage. DRAM is commonly included in DIMMs due to its relatively high-performance and low-cost. DRAM chips may include a plurality of integrated circuits and capacitors for data storage. The capacitors of each DRAM cell may store a charge, which may correspond to a bit storage value (e.g., 0, 1).

SUMMARY

Embodiments of the present disclosure include a method, computer program product, and system for memory management. The method may include obtaining a set of volatile memory sensor data and a set of non-volatile memory sensor data. The method may include analyzing the set of volatile memory sensor data and the set of non-volatile memory sensor data. The method may include determining, based on the analyzing, that a memory condition exists. Further, the method may include issuing, in response to determining that the memory condition exists, one or more memory actions.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data storage, and more particularly to memory module data storage. While the present disclosure is not necessarily limited to such applications, various aspects of the disclosure may be appreciated through a discussion of various examples using this context.

Traditional Dual In-line Memory Modules (DIMMs) typically only include volatile memory, such as Dynamic Random Access Memory (DRAM). Non-Volatile Dual In-line Memory Modules (NVDIMMs), on the other hand, include non-volatile memory (e.g., flash memory) coupled to the volatile memory medium (e.g., DRAM) present on the memory module.

DRAM is used as main memory in computers due to its relative low-cost, high-capacity, and high-performance. However, because data storage in DRAM relies on capacitance, the data must be continually refreshed to ensure data integrity by maintaining the appropriate charge in each capacitor. Accordingly, if power is removed from DRAM, the data stored on the DRAM may be erased, as the capacitors will soon lose their charge corresponding to bit storage values.

Non-volatile memory, such as flash, on the other hand, maintains data integrity in the absence of a power supply. Technologies such as NAND Flash may integrate floating gate transistors to store charge (e.g., and thus data bits) in the absence of a power supply. However, due to the internal circuitry, performance of non-volatile memories may be slower than volatile memories.

NVDIMMs combine the speed of volatile memory with the persistence of non-volatile memory. Some examples of NVDIMMs include NVDIMM-N, NVDIMM-F, and NVDIMM-P. NVDIMM-N appears to the host device to operate as a typical DIMM, with the host device only interacting (e.g., reading/writing) with the DRAM on the module. However, if power is lost, an external power supply (e.g., a battery located on the module) may provide temporary power to the memory module such that the DRAM may be refreshed long enough that it can be backed-up onto a non-volatile memory medium on the module. After power is restored to the NVDIMM-N, the data can be transferred from the non-volatile memory medium back to the DRAM (or other volatile memory).

NVDIMM-P (also referred to as Hybrid DIMM) also includes both volatile and non-volatile memory types. However, as opposed to NVDIMM-N, in NVDIMM-P, both the volatile memory and non-volatile memory are accessible by the host. Accordingly, NVDIMM-P may be more flexible than NVDIMM-N, as data can be accessed from either the non-volatile or volatile memory under operation.

Due to the variations of NVDIMMs emerging in the industry, a single DIMM may have multiple memory mediums, each having different power, performance, and thermal characteristics and constraints. Accordingly, issuing an intelligent control of commands to optimize each memory medium according to its thermal/power characteristics and constraints may be beneficial. If there is a power and/or thermal event (e.g., overheating/excessive power consumption) occurring in the NVDIMM, control commands may be issued to optimize the power and thermal conditions at the media prior to taking the NVDIMM offline or making a functional unit replacement (e.g., in the case of component failure). This may not only improve the performance of the NVDIMM, but may additionally lower the risk of thermal/power induced failure.

It is to be understood that the aforementioned advantages are example advantages and should not be construed as limiting. Embodiments of the present disclosure can contain all, some, or none of the aforementioned advantages while remaining within the spirit and scope of the present disclosure.

Embodiments of the present disclosure include a Non-Volatile Dual In-Line Memory Module (NVDIMM). The NVDIMM may include a non-volatile memory, a volatile memory, and an NVDIMM memory controller. The host device (e.g., a host processor or host controller) and/or NVDIMM controller (e.g., one or more processing circuits) may issue a request to receive sensor data associated with the non-volatile memory and volatile memory. The NVDIMM controller may then receive the sensor data associated with the non-volatile memory and volatile memory. The sensor data may then be analyzed by the one or more processing circuits. The sensor data of the volatile and non-volatile memory may be compared to one or more memory threshold values to determine whether the sensor data exceeds the one or more memory threshold values. If the sensor data exceeds the one or more memory threshold values, the one or more processing circuits may be configured to issue one or more memory actions. The one or more memory actions may include managing reads/writes (e.g., controlling the frequency of read/write commands), backing up memory (e.g., transferring data from the volatile memory to the non-volatile memory, and vice versa), dictating read/write access (e.g., reading from volatile memory versus reading from non-volatile memory), throttling voltage (e.g., reducing the voltage provided to the memory mediums), controlling refresh rate (e.g., increasing or decreasing the refresh rate of DRAM), and/or varying the scrub rate (e.g., altering the frequency at which data is inspected and corrected using a redundant copy of the data).

Figure 1:
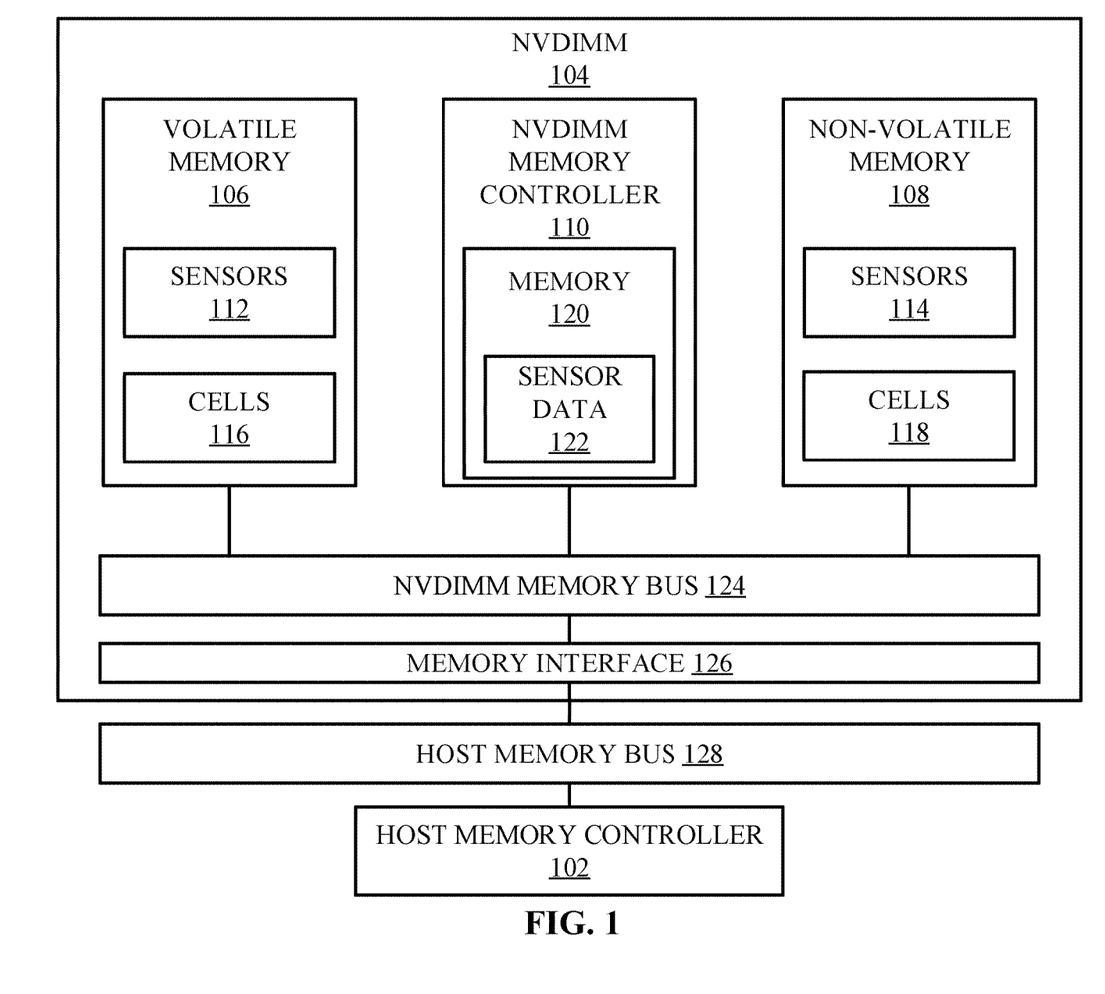
FIG. 1 depicts a block-diagram of an NVDIMM communicatively coupled to a host memory controller, in accordance with embodiments of the present disclosure.

FIG. 1 depicts a block diagram of a Non-Volatile Dual In-line Memory Module (hereinafter "NVDIMM") 104 communicatively coupled to a host, in accordance with embodiments of the present disclosure. The NVDIMM 104 may include volatile memory 106, non-volatile memory 108, and an NVDIMM memory controller 110, which may be communicatively coupled to each other for inter-component communication via the NVDIMM memory bus 124. A host memory controller 102 may be communicatively coupled to the NVDIMM 104 via a host memory bus 128 and a memory interface 126. Generally, the NVDIMM memory controller 110, volatile memory 106, non-volatile memory 108, and host memory controller 102 may be communicatively coupled, directly or indirectly, for inter-component communication via the NVDIMM memory bus 124, memory interface 126, and host memory bus 128.

The host memory controller 102 may be configured to issue commands to the NVDIMM memory controller 110. In some embodiments, the commands issued by the host memory controller 102 may be stored in memory 120 of the NVDIMM memory controller 110, and may be processed therefrom. The host memory controller 102 may issue commands to the NVDIMM memory controller 110 to request data from the volatile memory 106 and non-volatile memory 108. The NVDIMM memory controller 110 may then be configured to provide data associated with the volatile memory 106 and non-volatile memory 108 to the host memory controller 102. In some embodiments, the host memory controller 102 may request data stored in memory cells 116, 118 of the volatile memory 106 and non-volatile memory 108, respectively. Accordingly, the host memory controller 102 may directly access memory stored in either the volatile memory 106 or non-volatile memory 108.

The host memory controller 102 may request the NVDIMM memory controller 110 to retrieve data obtained from sensors 112, 114 (e.g., sensor data 122) of the volatile memory 106 and non-volatile memory 108, respectively. In some embodiments, the NVDIMM memory controller 110 may be configured to store the sensor data 122 in the memory 120 of the NVDIMM memory controller 110. Thereafter, the NVDIMM controller 110 may be configured to process the sensor data 122. In some embodiments, the sensor data 122 may be stored elsewhere in the NVDIMM 104, such as in memory cells 116 of the volatile memory 106 or in memory cells 118 of the non-volatile memory 108. In some embodiments, the sensor data 122 may not be stored on the NVDIMM 104, but may be redirected elsewhere for storage (e.g., host memory controller 102, SSD, disk storage, tape storage, cache, etc.).

The host memory controller 102 may be configured to analyze the sensor data 122 obtained from the NVDIMM memory controller 110. Based on the sensor data 122, the host memory controller 102 may be configured to transmit one or more thermal/power actions to the NVDIMM memory controller 110. The host memory controller 102 may be configured to issue the thermal/power actions through the NVDIMM memory controller 110.

As described herein, the NVDIMM memory controller 110, the host memory controller 102, and a host processor communicatively coupled to the host memory controller 102 (collectively referred to as "processing circuits") may be configured to complete one or more of the described commands/functions.

In some embodiments, the host memory controller 102 may not be included, and the aforementioned commands and functions issued by the host memory controller 102 may be completed by the NVDIMM memory controller 110. For example, in some embodiments, the NVDIMM memory controller 110 may request sensor data 122, and may store the sensor data 122 in any suitable location. The NVDIMM memory controller 110 may also be configured to analyze the sensor data 122, and may be configured to issue one or more thermal/power actions based on the sensor data 122.

Any number and/or configuration of NVDIMM memory controllers 110 may be implemented on the NVDIMM 104. In some embodiments, the NVDIMM 104 may include two or more controllers. In some embodiments, one controller may control data flow for the volatile memory 106, and another controller may control data flow for the non-volatile memory 108. In some embodiments, only one controller may be integrated on the NVDIMM 104 (e.g., the NVDIMM memory controller 110). In some embodiments, with multi-channel memory architecture, there may be a memory controller corresponding to each memory channel. Any suitable number of NVDIMM memory controllers 110 may be implemented on the NVDIMM 104, and may depend on the architecture of the NVDIMM 104.

Further, any number and/or configuration of host memory controllers 102 may be implemented. In some embodiments, the host memory controller 102 may be integrated on a host processor. In these embodiments, the host memory controller 102 may control data flow from the host processor to the NVDIMM 104. In some embodiments, the host memory controller 102 may be included on a separate chip. In some embodiments, the host may include two or more host memory controllers 102, and/or the NVDIMM 104 may be communicatively coupled to multiple hosts, each having its own host memory controller. Any suitable arrangement of integrated and/or stand-alone host memory controllers 102 may be implemented. In some embodiments, no host memory controller 102 may be included.

Volatile memory 106 may include any suitable type of volatile memory cells 116 (e.g., memory maintained while connected to a power source). For example, volatile memory cells 116 may be Random Access Memory (RAM) cells. The selected RAM may be Dynamic Random Access Memory, Static Random Access Memory, Extended Data-out RAM (EDO RAM), Synchronous DRAM (SDRAM), and/or Double Data Rate SDRAM (DDR SDRAM), to name a few. The type of RAM may be selected based on the data storage, power, data transfer, and price requirements. For example, DRAM is generally inexpensive compared to SRAM, as DRAM requires one transistor and one capacitor per data bit, whereas SRAM requires 6 transistors per data bit. For this reason, DRAM may be used in situations requiring larger data loads in smaller locations (e.g., increased data density). However, SRAM may be advantageous in situations requiring faster data transfer speeds.

Non-volatile memory 108 may include any suitable type of non-volatile memory (e.g., memory maintained without a power supply). For example, the non-volatile memory 108 may include NAND flash memory, NOR flash memory, Erasable Programmable Read-Only Memory (EPROM), solid-state storage, Non-Volatile Random Access Memory (NVRAM) (e.g., Resistive Random-Access Memory (Re-RAM)), hard disk drives, magnetic tape, and/or optical discs. In some embodiments, NAND flash memory may be selected due to its relatively low price, fast read/write/erase times, and long life span (e.g., a high number of erase cycles before memory wear).

Sensors 112, 114 of the volatile memory 106 and non-volatile memory 108 respectively may include any suitable type of sensors (e.g., physical sensors on the NVDIMM 104). The sensors may be used to monitor the health (e.g., performance or state) of the memory mediums under operation. In some embodiments, sensors 112 and 114 may include thermal sensors to monitor the temperature of the volatile memory 106 and non-volatile memory 108. In some embodiments, sensors 112 and 114 may include power sensors to monitor the voltage applied to, or power consumed by, each memory medium. In some embodiments, humidity sensors may be included to indicate the level of moisture of each memory medium. However, any suitable type of sensor may be included, and may be selected to monitor the performance of the memory mediums under operation.

Further any suitable location and/or number of sensors 112 and 114 may be implemented. In some embodiments, varying types of sensors may be integrated into a single sensor (e.g., a combined power/thermal sensor), and one sensor may be disposed on each memory medium (e.g., volatile and non-volatile mediums). In some embodiments, multiple sensors may be placed on varying locations on each memory medium. For example, volatile memory 106 may include a temperature sensor on four different quadrants of the volatile memory 106. Accordingly, the sensors may report a temperature for each quadrant of the volatile memory, which may be combined (e.g., averaged) or considered separately when monitoring the health of the NVDIMM 104. In some embodiments, only one thermal and power sensor may be implemented for the NVDIMM 104. For example, in some embodiments, the volatile memory and non-volatile memory may be disposed proximate to each other such that the same sensors may be used to monitor both mediums. In some embodiments, the sensors 112, 114 may not be physically present on the NVDIMM 104. For example, in some embodiments, the power sensor may be located on the motherboard or power supply unit (PSU) of the device, such that the voltage allocated to each memory medium is indicated. However, any suitable number and/or placement of sensors otherwise consistent with this disclosure is contemplated.

The sensor data 122 may be collected from sensors 112, 114 of the volatile memory 106 and non-volatile memory 108 in any manner. In some embodiments, the sensor data 122 is collected as requested (e.g., by a user or host). In some embodiments, the sensor data 122 may be collected periodically. The temporal period at which sensor data 122 is collected may depend on the sensor data 122. For example, if sensor data 122 includes temperatures, the rate at which sensor data 122 is collected may be relatively slow (e.g., once every second), as temperature may gradually change. Further, sensor data 122 may be collected based on bandwidth (e.g., network or bus bandwidth) considerations. In some embodiments, if collecting sensor data 122 consumes excessive bandwidth, data collection frequency (e.g., sampling rate) may be reduced. For example, the data collection frequency may be reduced during times of heavy reads and writes to reduce the NVDIMM memory bus 124 traffic and congestion.

Any type of NVDIMM memory controller 110 may be implemented, and may depend on the architecture of the NVDIMM (e.g., memory channels/types) and actions to be issued. For example, in embodiments with DRAM volatile memory and NAND flash non-volatile memory, the NVDIMM memory controller 110 may be configured to be compatible with both memory types. That is, in these embodiments, the NVDIMM memory controller 110 may be configured to read/write to the DRAM and NAND flash, and refresh the DRAM as necessary. Similarly, the NVDIMM memory controller 110 may be configured to be compatible with a range of memory mediums. In some embodiments, the NVDIMM memory controller 110 may be a Double Data Rate (DDR) memory controller, such that data may be transferred on the rising and falling edge of each clock cycle (e.g., twice the data transfer capability without increasing the clock rate). In some embodiments, the NVDIMM memory controller 110 may be an entirely hardware controller, while in other embodiments the NVDIMM memory controller 110 may include hardware and software (e.g., a microprocessor configured to execute software instructions).

The NVDIMM memory controller 110 may be configured to issue any number of actions. For example, the NVDIMM memory controller 110 may be configured to manage reads/writes (e.g., control the frequency of read/write commands), backup memory (e.g., transfer data from the volatile memory 106 to the non-volatile memory 108, and vice versa), dictate read/write access (e.g., read from volatile memory 106 versus read from non-volatile memory 108), throttle voltage (e.g., reduce or increase voltage to memory mediums), control refresh rate (e.g., increase or decrease refresh rate of DRAM), and/or vary the scrub rate (e.g., alter frequency at which data is inspected and corrected using a redundant copy of the data).

Figure 2:
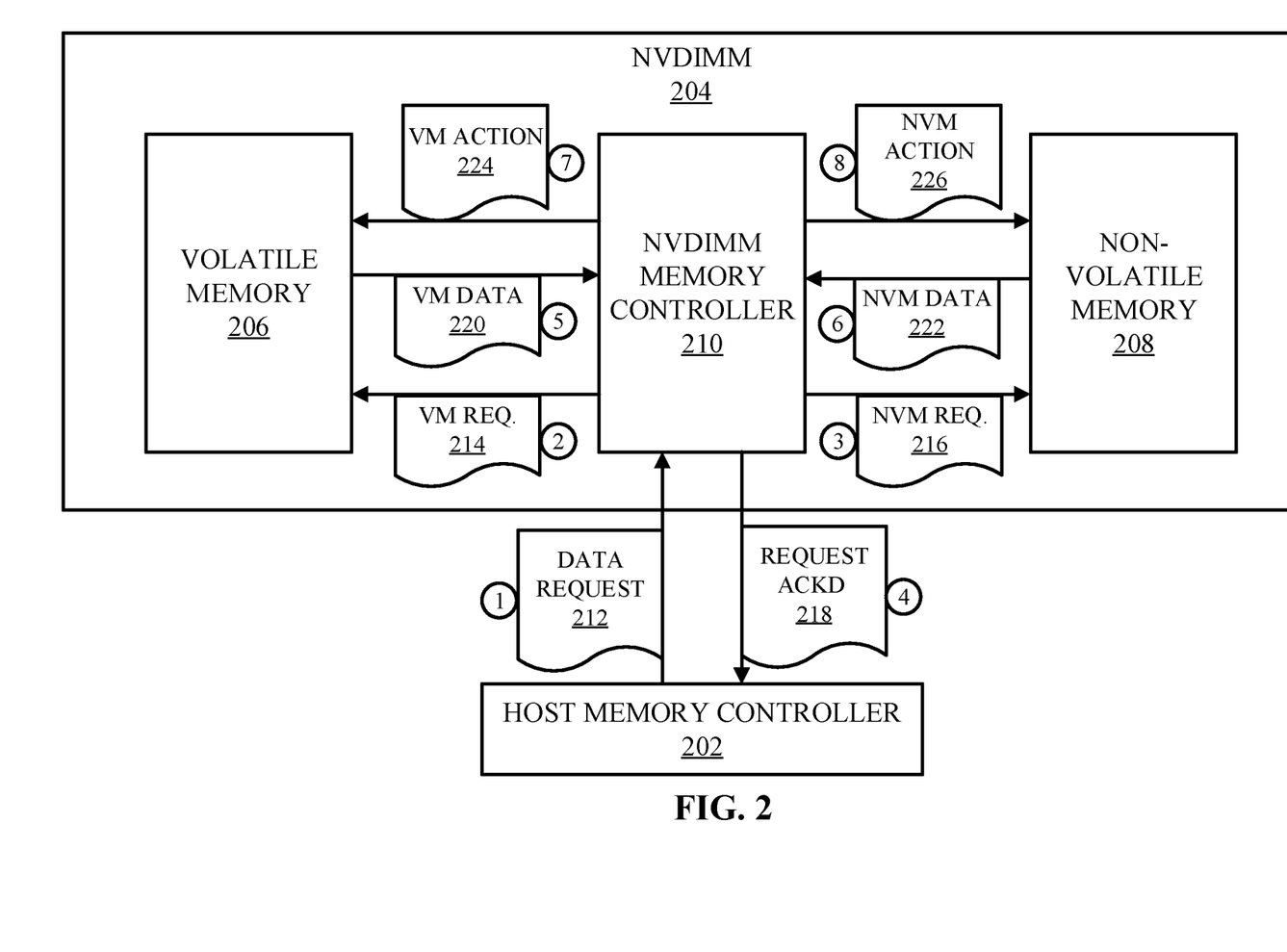
FIG. 2 depicts a block-diagram of data flow between an NVDIMM and host memory controller, in accordance with embodiments of the present disclosure.

FIG. 2 depicts a block diagram of an example data flow between a host memory controller 202 and an NVDIMM memory controller 210, in accordance with embodiments of the present disclosure. As described herein, sensors of the volatile memory 206 and non-volatile memory 208 may be substantially the same as sensors 112 and 114 previously described.

The host memory controller 202 may first issue a data request 212 to the NVDIMM memory controller 210. The data request 212 may request data from sensors (e.g., sensors 112 and 114, as shown in FIG. 1) present on volatile memory 206 and non-volatile memory 208. In some embodiments, the data request 212 may only request data from a specific sensor and/or sensor type. For example, the data request 212 may request temperature data associated with each memory medium (e.g., volatile memory 206 and non-volatile memory 208). In some embodiments, data request 212 is periodically issued to monitor the health of the memory mediums under operation. In some embodiments, data request 212 is issued based on previously obtained sensor data. For example, if the rate of change of temperature is increasing within the memory mediums, the data request 212 may be issued more frequently (e.g., sampling rate may be dependent on sensor data).

After the data request 212 is received by the NVDIMM memory controller 210, the NVDIMM memory controller 210 may request data from the volatile memory 206 and non-volatile memory 208 based on the data request 212. For example, if the data request 212 pertains to temperature, the NVDIMM memory controller 210 may issue a volatile memory request 214 and a non-volatile memory request 216 to request temperatures from thermal sensors associated with the volatile memory 206 and non-volatile memory 208. If the data request 212 specifies that power data (e.g., voltages or power draw) associated with the volatile memory 206 is requested by the NVDIMM memory controller 210, then the NVDIMM memory controller 210 may issue a volatile memory request 214 for power data associated with the volatile memory 206. However, any volatile memory request 214 and/or non-volatile memory request 216 may be issued, and may depend on the data request 212 as issued by the host memory controller 202. In some embodiments, the data request 212 issued by the host memory controller 202 may be temporarily stored in memory on the NVDIMM memory controller 210 and processed after a temporal period or other trigger. For example, the NVDIMM memory controller 210 may store the data request 212 in its memory until a triggering condition occurs, and then the NVDIMM memory controller 210 may execute the request. The triggering condition may be the memory bus bandwidth, which may be monitored by the NVDIMM memory controller 210, being below a threshold bandwidth. By holding the data request 212 until the bus bandwidth is below the threshold, the NVDIMM memory controller 210 may ensure that the memory monitoring does not interfere with normal read/write operations.

In some embodiments, the NVDIMM memory controller 210 may execute the data request 212 even if the bus bandwidth exceeds the threshold. This may be done if, for example, the data request 212 indicates a high importance and/or the latest sensor data indicates that the volatile or non-volatile memory 206, 208 is operating outside of normal conditions (e.g., with a temperature or voltage higher than a predetermined threshold).

After the NVDIMM memory controller 210 issues volatile memory requests 214 and non-volatile memory requests 216 based on the data request 212, the NVDIMM memory controller 210 may transmit an acknowledgement 218 to the host memory controller 202. The request acknowledgement 218 may indicate to the host memory controller 202 that the data request 212 has been successfully processed. In some embodiments, if the request acknowledgement 218 was not transmitted by the NVDIMM memory controller 210, the host memory controller 202 may reissue the data request 212 (e.g., after a predetermined amount of time).

After the request acknowledgement 218 is transmitted, the NVDIMM memory controller 210 may receive the volatile memory data 220 and non-volatile memory data 222. The volatile memory data 220 may include data pertaining to sensors of the volatile memory 206. Similarly, the non-volatile memory data 222 may include data pertaining to sensors of the non-volatile memory 208. For example, the volatile memory data 220 may include temperature and power data associated with the volatile memory 206, and the non-volatile memory data 222 may include temperature and power data associated with the non-volatile memory 208. The data may indicate the current temperature of the volatile memory 206 and non-volatile memory 208, and the current voltage provided to, or power consumed by, the volatile memory 206 and non-volatile memory 208.

In some embodiments, the sensor data may be continuously updated and a history of sensor data may be included in the volatile memory 206 and/or non-volatile memory 208. In these embodiments, the volatile memory data 220 and non-volatile memory data 222 may include a set of temperature/power data over time. The sampling rate and historical reach (e.g., the time period in which data is rewritten) may be user defined or based on historical data. For example, the volatile memory data 220 may include temperature data obtained every minute (e.g., sampling rate) over the last 10 minutes (e.g., historical reach). Accordingly, in this example, the NVDIMM memory controller 210 may receive 10 temperature measurements for the volatile memory 206 based on the sampling rate and historical reach. Further, in this example, the NVDIMM memory controller 210 may only issue volatile memory requests 214 every 10 minutes, as opposed to every minute. This may provide an indication for temperature change over the 10 minutes sampled. Based on the history of the sensor data (e.g., rate of change of the sensor data), the sampling rate and/or historical reach may be modified. For example, if the temperature remains static over 10 minutes, the sampling rate may be decreased. Likewise, if the temperature varies over 10 minutes (e.g., shows a continuous increase/decrease, or oscillates), the sampling rate may be increased. This may help identify memory conditions (e.g., high temperatures/voltages) that may cause the NVDIMM 204 to experience a runaway (e.g., thermal runaway), or are otherwise damaging to the NVDIMM 204, before permanent damage occurs. Alternatively, the NVDIMM memory controller 210 may obtain sensor data as requested, without storing a history of sensor data.

After volatile memory data 220 and non-volatile memory data 222 (e.g., sensor data) is received, the sensor data may be analyzed. The sensor data may be analyzed by one or more processing circuits of the system (e.g., NVDIMM memory controller 210, host memory controller 202, and/or a host processor). Analyzing the sensor data may include comparing the data to predefined thresholds. The volatile memory data 220 may be compared to one or more volatile memory data threshold values and the non-volatile memory data 222 may be compared to one or more non-volatile memory data thresholds (e.g., the set of sensor data may be compared to a set of threshold values). Because the volatile memory 206 and non-volatile memory 208 may perform differently at varying temperatures and power levels, the volatile memory data threshold values may differ from the non-volatile memory data thresholds. If the sensor data is determined to be outside of the set of predefined threshold values (e.g., exceeds a maximum threshold or is below a minimum threshold) for the volatile memory 206 and non-volatile memory 208, then one or more memory actions may be issued based on the analysis.

Comparing the sensor data to threshold values may include determining whether the sensor data falls within an acceptable range. For example, if a set of volatile memory thresholds includes a temperature threshold range of 40° F.-150° F., the volatile memory data 220 may breach (e.g., not satisfy) the set of volatile memory thresholds if the volatile memory data 220 falls below 40° F. or surpasses 150° F. In some embodiments, the set of threshold values for the volatile memory 206 and non-volatile memory 208 may only include a lower and/or upper limit. For example, the set of threshold values for the volatile memory 206 may include an upper limit of 150° F., while the set of threshold values for the non-volatile memory may include an upper limit of 120° F. In this example, if the volatile memory data 220 and/or non-volatile memory data 222 exceeds 150° F. and/or 120° F. respectively, then the set of sensor data (e.g., the volatile memory data 220 and non-volatile memory data 222) may be determined to exceed the set of threshold values defined for the volatile and non-volatile memory 206, 208. However, thresholds may be defined in any other suitable manner. Further, data analysis may be completed in any other suitable manner.

In some embodiments, multiple sensors may measure the same metric (e.g., temperature). In these embodiments, analyzing the set of sensor data may include calculating a statistical value, such as the mean, median, or other value. The calculated statistical value may then be compared to the one or more thresholds. Likewise, the set of sensor data may include historical data, which may be combined into a single value (e.g., rate, acceleration, rolling average, etc.). The combined value may then be compared to the thresholds.

After the set of sensor data is analyzed, and the set of sensor data is determined to exceed the set of memory threshold values, one or more memory actions may be issued. The one or more memory actions may be issued by any of the one or more processing circuits described (e.g., the NVDIMM memory controller 210, the host memory controller 202, or the host processor). A plurality of actions may be issued, individually or in combination, and may depend on the sensor data. Example actions issued by the one or more processing circuits include managing reads/writes (e.g., controlling the frequency of read/write commands), backing up memory (e.g., transferring data from the volatile memory 206 to the non-volatile memory 208, and vice versa), dictating read/write access (e.g., reading from volatile memory 206 versus reading from non-volatile memory 208, and vice versa), throttling voltage (e.g., reducing or increasing voltage to memory mediums), controlling refresh rate (e.g., increasing or decreasing refresh rate of DRAM), and/or varying the scrub rate (e.g., altering the frequency at which data is inspected and corrected using a redundant copy of the data). In some embodiments, the actions may include backing up data to a different memory module or storage device (e.g., a hard-disk drive).

In some embodiments, a power and/or thermal sensor measurement for the volatile memory 206 may exceed a power and/or thermal threshold of the set of memory threshold values. Accordingly, the NVDIMM memory controller 210 may issue a volatile memory action 224 based on the volatile memory data 220 breaching the set of memory threshold values. The volatile memory action 224 may include reducing the refresh rate of the volatile memory 206. Reducing the refresh rate may reduce the amount of power consumed by the volatile memory 206, and may prevent a power and/or thermal induced failure of the volatile memory 206. In this example, the data may also be simultaneously copied to the non-volatile memory 208 in response to the power sensor measurement breaching the power threshold. That is, a non-volatile memory action 226 may be issued in response to volatile memory data 220 exceeding a volatile memory threshold value. This may provide persistence to the data stored in the volatile memory 206, as reducing the refresh rate may increase the probability of data loss/corruption. Alternatively, the NVDIMM memory controller 210 may dedicate a portion of the non-volatile memory 208 as parity bits of the volatile memory 206 when (or before) the refresh rate is reduced. The parity bits may then be used to check the volatile memory 206 for memory errors (e.g., bit flips), as opposed to, or in addition to, backing-up the data to the non-volatile memory 208.

In some embodiments, in response to the sensor data breaching the set of threshold values, the volatile memory 206 may be powered down, and the data may be copied (e.g., read then written) to the non-volatile memory 208. In some embodiments, the volatile memory 206 may approach a thermal/power limit, and may be at risk for thermal/power induced failure (e.g., as indicated by sensor data). The NVDIMM memory controller 210 may then issue a volatile memory action 224 to power down the volatile memory 206 temporarily, and the NVDIMM memory controller 210 may issue a non-volatile memory action 226 to copy the data over to the non-volatile memory 208. The data may then be accessed directly from the non-volatile memory 208 by the one or more processing circuits. During copying, the NVDIMM memory controller 210 may generate a table that maps locations in the volatile memory 206 to corresponding locations in the non-volatile memory 208 where corresponding data is moved. When memory read/write commands come in, the NVDIMM memory controller 210 may translate the address from the volatile memory 206 to the corresponding address in the non-volatile memory 208, and it may retrieve the requests data from the non-volatile memory 208. Accordingly, the host device may operate (e.g., issue commands and read/write requests) as if the volatile memory 206 were still enabled. Further, the data may be restored to the volatile memory 206 when power is restored to the volatile memory 206.

Actions may be issued to subsets of the non-volatile memory 206 and non-volatile memory 208. In some embodiments, subsets of the volatile memory 206 may be mapped onto the non-volatile memory 208 in response to volatile memory data 220 exceeding a threshold value. For example, a temperature sensor of the volatile memory 206 may correspond to 4 rows of data. In response to the sensor data corresponding to the 4 rows exceeding a temperature threshold, the 4 rows of data may be mapped onto the non-volatile memory 208 (e.g., with row address indicators) such that the data can be restored/remapped to the appropriate rows upon repowering the volatile memory 206 by the NVDIMM memory controller 210. Similarly, other thermal and/or power actions such as altering refresh rate, varying scrub rate, and controlling read/write frequency may be implemented on specific cells, columns, and/or rows, and may depend on the number and/or placement of sensors.

In some embodiments, the non-volatile memory data 222 may exceed a thermal threshold value and the volatile memory data 220 may not exceed a thermal threshold value. In some embodiments, the data stored in the non-volatile memory 208 may be copied onto the volatile memory 206 prior to thermal/power induced failure of the non-volatile memory. That is, a volatile memory action 224 may be issued by the NVDIMM memory controller 210 in response to the non-volatile memory data 222 breaching a threshold value. Further, in some embodiments, the NVDIMM memory controller 210 may issue a non-volatile memory action 226 to temporarily cease writes/reads to the non-volatile memory 208. Alternatively, the NVDIMM memory controller 210 may issue a non-volatile memory action 226 to reduce the frequency in which data is read from and/or written to the non-volatile memory 208. Reducing read/write frequency to the non-volatile memory at high temperatures may prevent memory wear on the non-volatile memory 208, as the magnitude of wear may be greater at higher temperatures. For example, if NAND flash memory has a lifespan of 5,000 erase cycles at a particular temperature, the NAND flash memory may only have a lifespan of 4,000 erase cycles at a higher temperature. Accordingly, reducing the read/write frequency to the non-volatile memory 208 may increase the longevity of the memory medium.

In some embodiments, the scrub rate for DRAM (e.g., or any other error-correctable volatile memory) on the volatile memory 206 may be altered based on volatile memory data 220. For example, if thermal/power data included in the non-volatile memory data 220 exceeds a thermal/power threshold value, the NVDIMM memory controller 210 may issue a volatile memory action 224 to reduce the scrub rate of the volatile memory 206. Correcting bit errors with an error-correcting code (ECC) (e.g., memory scrubbing) may consume excessive power and/or increase temperature of the volatile memory 206. Accordingly, the scrub rate of the volatile memory 206 may be reduced in response to the volatile memory data 220 exceeding a threshold. In these embodiments, the NVDIMM memory controller 210 may also issue a non-volatile memory action 226 to back the data up from the volatile memory 206 to the non-volatile memory 208, as the data may have a greater likelihood of corruption.

In some embodiments, the NVDIMM memory controller 210 may be configured to throttle voltage provided to the volatile memory 206 and/or non-volatile memory 208 in response to sensor data exceeding threshold values. For example, if a power sensor measurement of the sensor data exceeds a power threshold, the NVDIMM memory controller 210 may be configured to reduce the power provided to either the volatile memory 206 or non-volatile memory 208, prior to a power induced failure at the NVDIMM 204.

In some embodiments, the NVDIMM memory controller 210 may dictate read/write access based on the volatile memory data 220 and non-volatile memory data 222. For example, if the non-volatile memory data 222 exceeds a power/thermal threshold, the NVDIMM memory controller 210 may dictate read access to the volatile memory 206 (e.g., read from the volatile memory 206). As another example, if the volatile memory data 220 exceeds a power/thermal threshold the NVDIMM memory controller 210 may dictate read access to the non-volatile memory 208 (e.g., read from the non-volatile memory 208).

In some embodiments, in response to the volatile and/or non-volatile memory data 220, 222 exceeding power/thermal thresholds, the NVDIMM memory controller 210 may utilize page-swapping (also known as paging). For example, the NVDIMM memory controller 210 may disperse data of the volatile memory 206 and/or non-volatile memory 208 to one or more additional memory mediums (e.g., a hard disk drive) to be accessed as main memory. Further, in some embodiments, the NVDIMM memory controller 210 may be configured to manage data based on priority (e.g., access frequency).

For example, in some embodiments, the volatile memory data 220 and non-volatile memory data 222 each may not satisfy a volatile memory thermal/power threshold and non-volatile memory thermal/power threshold, respectively. Accordingly, the NVDIMM memory controller 210 may be configured to reduce the refresh rate of the volatile memory 206 in response to the volatile memory data 220 not satisfying the volatile memory power/thermal threshold. Additionally, the NVDIMM memory controller 210 may back up a first portion (e.g., a first bank) of the volatile memory 206 to a non-volatile memory medium (e.g., non-volatile memory 208, disk storage, etc.), to mitigate the risk of data loss due to reducing the refresh rate of the volatile memory 206. In some embodiments, the first portion of data may be backed up prior to reducing the refresh rate. The first portion of memory may be commonly accessed, and therefore it may be beneficial to retain the first portion of memory on the volatile memory 206, as it may be accessed with faster speeds. The NVDIMM memory controller 210 may transfer a second portion (e.g., a second bank) of the volatile memory 206 to the non-volatile memory 208 for direct access by the host device. The second bank may include intermediate priority data (e.g., data that is not accessed as much as the first portion), and may be accessed directly from the non-volatile memory 208. However, because the non-volatile memory data 222 may also not satisfy the non-volatile thermal/power threshold, the NVDIMM memory controller 210 may transfer a third portion (e.g., a third bank) of the volatile memory 206 to off-module disk storage (e.g., a hard drive) for use as main memory, as opposed to on the non-volatile memory 208, to reduce the load (e.g., the amount of data written to the non-volatile memory 208) on the non-volatile memory 208. The third portion may include low-priority (e.g., rarely accessed) data. After the second and third portions of the volatile memory 206 are transferred, the NVDIMM memory controller 210 may be configured to power down the second and third banks located on the volatile memory 206. This may reduce the power consumed by, and/or the temperature of, the volatile memory 206.

Ultimately, the host device may then access the first portion of data from the volatile memory 206, the second portion of data from the non-volatile memory 208, and the third portion of data from off-module disk storage under operation. This may reduce the power consumed by, and/or the temperature of, the volatile memory 206 and non-volatile memory 208 simultaneously, while retaining high priority data for high-speed access. Further, this may allow constant data access, without requiring temporary power down.

The aforementioned commands may be completed in any order and are not limited to those described (e.g., as indicated by the numbered circles). Additionally, some, all, or none of the aforementioned operations may be completed, while still remaining within the spirit and scope of the present invention. For example, in embodiments without a host memory controller 202, the NVDIMM memory controller 210 may be configured to complete all of the aforementioned commands. For example, the NVDIMM memory controller 210 may be configured to issue data requests 212, including volatile memory data requests 214 and non-volatile memory data requests 216. In these embodiments, the NVDIMM memory controller 210 may not transmit a request acknowledgement 218. Further, the NVDIMM memory controller 210 may be configured to analyze the volatile memory data 220 and non-volatile memory data 222 and issue volatile memory actions 224 and/or non-volatile memory actions 226 based on the sensor data.

Figure 3:
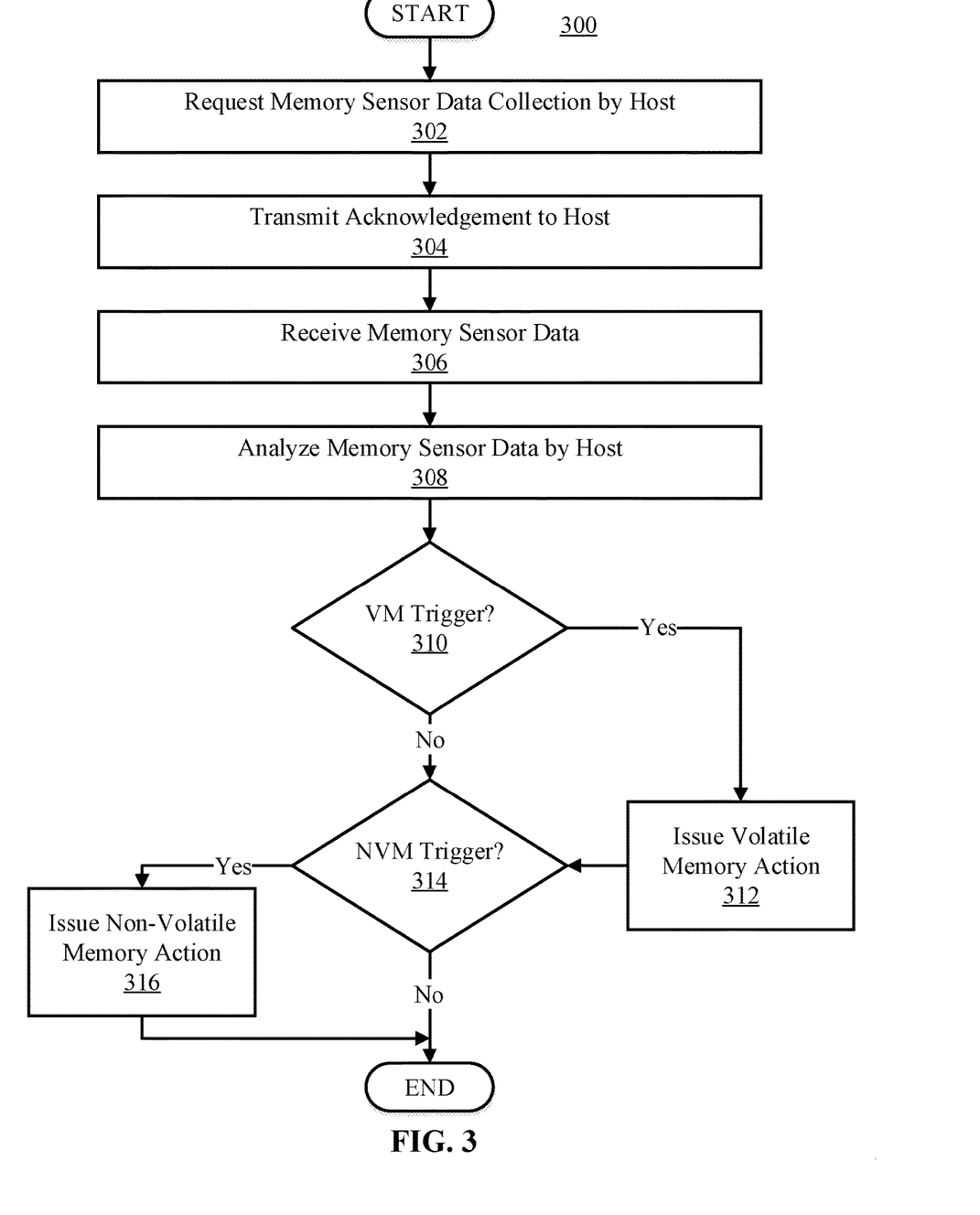
FIG. 3 depicts a flow chart of an example method for managing an NVDIMM by a host device, in accordance with embodiments of the present disclosure.

FIG. 3 illustrates a flow chart of an example method 300 for managing an NVDIMM by a host device, in accordance with embodiments of the present disclosure. In some embodiments, one or more of the operations of method 300 may be performed by a processor circuit embedded on a memory module (e.g., NVDIMM memory controller 210 shown in FIG. 2). In some embodiments, one or more operations of method 300 may be performed by a user, or by a processor (e.g., host memory control 102 shown in FIG. 1) in response to user input. As described herein, the NVDIMM, volatile memory, non-volatile memory, sensor data, host controller, host processor, memory actions, and NVDIMM memory controller may be substantially the same as the NVDIMM 104/204, volatile memory 106/206, non-volatile memory 108/208, volatile memory sensor data 220 or non-volatile sensor data 222, host memory controller 102/202, host processor, volatile memory action 224 or non-volatile memory action 226, and NVDIMM memory controller 110/210 previously described in FIG. 1 and FIG. 2.

Example method 300 may start at operation 302, where a request for memory sensor data collection may be issued by the host device. In some embodiments, a host controller and/or host processor of the host device may request memory sensor data of the NVDIMM. The request may be forwarded to the NVDIMM memory controller of the NVDIMM, and may be forwarded to the volatile and/or non-volatile memory of the NVDIMM based on the initial request.

After the NVDIMM memory controller requests data from the volatile memory and non-volatile memory of the NVDIMM, the NVDIMM memory controller may transmit an acknowledgement to the host device at operation 304. The acknowledgement may indicate that the request was successfully processed. In some embodiments, the acknowledgement may include an estimated time for the data to be received by the host processor and/or host memory controller.

The host may then receive the memory sensor data at operation 306. The memory sensor data received by the host may correspond to the initial request. For example, if temperature data corresponding to volatile memory on the NVDIMM was requested, then temperature sensor data associated with the volatile memory may be received. Similarly, if all data associated with each sensor of the volatile and non-volatile memory mediums is requested, all data associated with each sensor of the volatile and non-volatile memory may be received.

After the memory sensor data is received at operation 306, the host may analyze the memory sensor data at operation 308. As previously mentioned, analyzing the memory sensor data may include comparing the memory sensor data to one or more thresholds. If the memory sensor data exceeds one or more memory threshold values, then one or more memory actions may be issued (e.g., see operations 312/316).

At operation 310, the host may determine whether there is a volatile memory trigger. In some embodiments, a volatile memory trigger may be determined to exist if volatile memory sensor data exceeds a volatile memory threshold value. If a volatile memory trigger is determined at operation 310, then the host device may issue one or more volatile memory actions at operation 312. Example volatile memory actions may include altering refresh rate, altering scrub rate, backing up the volatile memory, powering the volatile memory down, reducing read/write frequency to the volatile memory, and/or throttling voltage provided to the volatile memory, to name a few. The volatile memory action at operation 312 can also include generating, in response to determining that the volatile memory condition exists, a set of parity volatile memory data, storing the set of parity volatile memory data in the non-volatile memory, and reducing the refresh rate of the volatile memory. The volatile memory action at operation 312 can further include comparing the set of parity volatile memory data to memory stored in the volatile memory, determining that the memory stored in the volatile memory is corrupt based on the comparison between the set of parity volatile memory data and the memory stored in the volatile memory, and correcting, based on determining that the memory stored in the volatile memory is corrupt, the memory stored in the volatile memory such that the memory stored in the volatile memory corresponds to the parity volatile memory data.

If a volatile memory trigger is not determined at operation 310 or the volatile memory action is issued at operation 312, then the host device may determine whether there is a non-volatile memory trigger at 314. In some embodiments, a non-volatile memory trigger may be determined to exist if non-volatile memory sensor data exceeds one or more non-volatile memory threshold values.

If a non-volatile memory trigger is determined at operation 314, then the host device may issue one or more non-volatile memory actions at operation 316. Example memory actions based on a volatile memory trigger may include backing up the non-volatile memory, removing power to the non-volatile memory, reducing read/write frequency to the non-volatile memory, and/or throttling voltage provided to the non-volatile memory, to name a few. If a non-volatile memory trigger is not determined at operation 314 or if a non-volatile memory action is issued at operation 316, example method 300 may end.

The aforementioned operations may be completed in any order and are not limited to those described. Additionally, some, all, or none of the aforementioned operations may be completed, while still remaining within the spirit and scope of the present invention. For example, in some embodiments, operation 304 is not completed, as the NVDIMM memory controller may be configured to complete all of the aforementioned operations. In these embodiments, all operations may be completed by the NVDIMM memory controller as opposed to the host device (e.g., host memory controller/processor). In some embodiments, operations 310 and 314 for determining volatile memory and non-volatile memory triggers respectively may be interchangeably completed. Further, in some embodiments, operations 310 and 314 may be simultaneously completed.

For example, in some embodiments, combination volatile and non-volatile memory actions may be issued. In these embodiments, the set of volatile memory sensor data may be compared to one or more volatile memory sensor thresholds, and the set of non-volatile memory sensor data may be compared to one or more non-volatile memory sensor thresholds. If both the volatile and non-volatile memories each do not satisfy the volatile and non-volatile memory thresholds, respectively, then a combination memory action may be issued. A combination action may include reducing the refresh rate of the volatile memory to lower the temperature and/or power consumption of the volatile memory. Further, the combination action may include backing up a high priority (e.g., frequently accessed) portion of the volatile memory into off-module storage to mitigate risk of data loss due to the lower refresh rate. A second portion of the volatile memory may be transferred to the non-volatile memory for main memory access. However, because a non-volatile memory trigger is also detected in this example, the amount of data written to the non-volatile memory may be limited. Accordingly, rarely accessed memory (e.g., a third portion) of the volatile memory may be transferred off-module to disk storage (e.g., a hard drive) for main memory access. Afterwards, the NVDIMM controller may be configured to power down the locations in the volatile memory corresponding to the data transferred to the non-volatile memory and off-module memory. This may reduce the power consumed by, and temperature of, the volatile memory.

Ultimately, in regard to the aforementioned embodiments, the high priority memory may be accessed directly from the volatile memory, the second portion of memory (e.g., originating in the volatile memory) may be accessed directly from the non-volatile memory, and the rarely accessed portion of memory may be accessed directly from the off-module disk storage by the host device. In some embodiments, as opposed to, or in addition to, directly accessing the rarely accessed portion of memory from off-module disk storage, the host device may swap the rarely accessed memory into the volatile memory from the off-module disk storage as needed (e.g., via paging). The combination action may not only provide constant data access without requiring power down, but may also mitigate the risk of thermal/power induced component failure.

Figure 4:
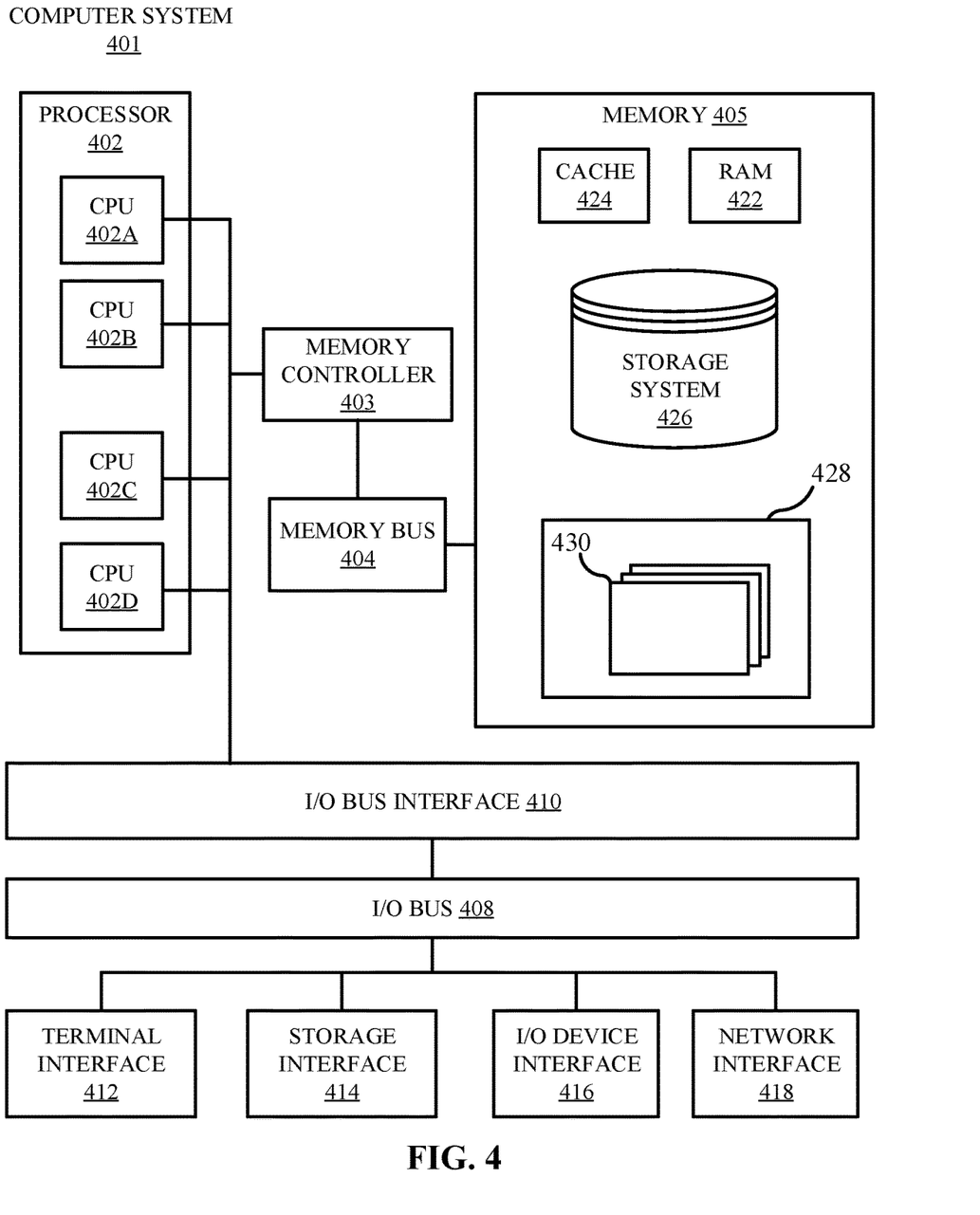
FIG. 4 depicts a high-level block diagram of an example computer system that may be used in implementing one or more of the methods, tools, and modules, and any related functions described herein (e.g., using one or more processor circuits or computer processors of the computer), in accordance with embodiments of the present disclosure.

Referring now to FIG. 4, shown is a high-level block diagram of an example computer system 401 (e.g., a host device) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 405, a terminal interface 412, a storage interface 414, an I/O (Input/Output) device interface 416, and a network interface 418, all of which may be communicatively coupled, directly or indirectly, for inter-component communication via a memory bus 404, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 405 and may include one or more levels of on-board cache. The control of data flow from the processor 402 to the memory subsystem 405 may be facilitated by memory controller 403. The memory controller 403 may be configured to direct data to appropriate locations (e.g., addresses) within the memory subsystem 405. The processor 402 may be substantially the same as the host processor previously described. The memory controller 403 may be substantially the same as the host memory controller 102/202 and/or NVDIMM memory controller 110/220 previously described.

System memory 405 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 405 can include flash memory, e.g., a flash memory stick drive or a flash drive. Memory devices can be connected to memory bus 404 by one or more data media interfaces. For example, the NVDIMM (e.g., NVDIMM 104) depicted in FIG. 1 may be connected to the memory bus 404 via a memory interface (e.g., memory interface 126 as depicted in FIG. 1). The NVDIMM may be included in the storage system 426. The memory 405 may include at least one program product having a set (e.g., at least one) of program modules that are configured to carry out the functions of various embodiments.

Further, one or more memory modules may be included in the storage system 426. For example, the NVDIMM (e.g., NVDIMM 104/204) may be included in the storage system 426. The one or more memory modules may include their own memory controllers (e.g., NVDIMM memory controller 110/220), processors, sensors (e.g., sensors 112/114), buses, and any other suitable memory module components.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, user interfaces, and program data. Each of the operating systems, one or more application programs, other program modules, and program data or some combination thereof, may include an implementation of a networking environment. Program modules 430 generally perform the functions or methodologies of various embodiments.

For example, in an embodiment of the present disclosure, the program modules 430 of the memory 405 may include an NVDIMM management module. The NVDIMM management module may include computer instructions to perform one or more of the aforementioned operations. For example, the NVDIMM management module may include computer instructions to collect data from the NVDIMM, analyze data of the NVDIMM, and/or issue one or more memory actions to the NVDIMM.

The computer system 401 may interface a variety of peripheral devices, storage devices, and networks through the terminal interface 412, storage interface 414, I/O device interface 416, and network interface 418. In some embodiments, the storage interface 414 may be substantially the same as the memory interface as depicted in FIG. 1 (e.g., memory interface 126). The storage interface 414 may allow the NVDIMM to be communicatively coupled to the computer system 401.

Although the memory bus 404 is shown in FIG. 4 as a single bus structure providing a direct communication path among the CPUs 402, the memory subsystem 405, and the I/O bus interface 410, the memory bus 404 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system comprising:
    a memory module including a volatile memory, a non-volatile memory, and one or more sensors; and
    one or more processing circuits, wherein the one or more processing circuits are configured to perform a method comprising:
        obtaining, from the one or more sensors, a set of volatile memory sensor data;
        obtaining, from the one or more sensors, a set of non-volatile memory sensor data;
        analyzing the set of volatile memory sensor data and the set of non-volatile memory sensor data, the analyzing including:
            comparing the set of volatile memory sensor data to a set of volatile memory thresholds; and
            comparing the set of non-volatile memory sensor data to a set of non-volatile memory thresholds;
        determining, based on the analyzing, that a memory condition exists, the determining including:
            determining, in response to the set of non-volatile memory sensor data not satisfying the set of non-volatile memory thresholds, that a non-volatile memory condition exists; and
        issuing, in response to determining that the memory condition exists, one or more memory actions, the issuing including:
            transferring, in response to determining that the non-volatile memory condition exists, a portion of the non-volatile memory to the volatile memory.

2. The system of claim 1, wherein the one or more processing circuits are embedded on the memory module.

3. The system of claim 1, wherein the set of volatile memory sensor data and the set of non-volatile memory sensor data each include:
    a set of thermal data; and
    a set of voltage data.

4. The system of claim 3, wherein analyzing the set of volatile memory sensor data and the set of non-volatile memory sensor data further comprises:
    comparing the set of thermal data for the volatile memory to a set of thermal thresholds for the volatile memory;
    comparing the set of thermal data for the non-volatile memory to a set of thermal thresholds for the non-volatile memory;
    comparing the set of voltage data for the volatile memory to a set of voltage thresholds for the volatile memory; and
    comparing the set of voltage data for the non-volatile memory to a set of voltage thresholds for the non-volatile memory.

5. The system of claim 4, wherein determining that the memory condition exists further comprises:
    determining, in response to the thermal data for the volatile memory not satisfying the set of thermal thresholds for the volatile memory, that a thermal volatile memory condition exists; and wherein issuing the one or more memory actions further comprises:
altering, in response to determining that the thermal volatile memory condition exists, a refresh rate of the volatile memory.

6. The system of claim 4, wherein determining that the memory condition exists further comprises:
determining, in response to the thermal data for the non-volatile memory not satisfying the set of thermal thresholds for the non-volatile memory, that a thermal non-volatile memory condition exists; and
wherein issuing the one or more memory actions further comprises:
altering, in response to determining that the thermal non-volatile memory condition exists, a read and write frequency of the non-volatile memory.

7. The system of claim 4, wherein determining that the memory condition exists further comprises:
determining, in response to the thermal data for the volatile memory not satisfying the set of thermal thresholds for the volatile memory and in response to the thermal data for the non-volatile memory not satisfying the set of thermal thresholds for the non-volatile memory, that a thermal combination volatile and non-volatile memory condition exists; and
wherein issuing the one or more memory actions further comprises:
backing-up, in response to determining that the thermal combination volatile and non-volatile memory condition exists, a first portion of the volatile memory;
transferring, in response to determining that the thermal combination volatile and non-volatile memory condition exists, a second portion of the volatile memory to the non-volatile memory;
transferring, in response to determining that the thermal combination volatile and non-volatile memory condition exists, a third portion of the volatile memory to off-module disk storage;
reducing, in response to determining that the thermal combination volatile and non-volatile memory condition exists, a refresh rate of the volatile memory; and
powering down, in response to transferring the second and third portions of the volatile memory, the second and third portions of the volatile memory.

8. The system of claim 4, wherein determining that the memory condition exists further comprises:
determining, in response to the voltage data over time for the volatile memory not satisfying the set of voltage thresholds for the volatile memory, that a voltage volatile memory condition exists; and
wherein issuing the one or more memory actions further comprises:
altering, in response to determining that a voltage volatile memory condition exists, a scrub rate of the volatile memory.

9. A method comprising:
obtaining a set of volatile memory sensor data corresponding to a volatile memory located on a Non-Volatile Dual In-Line Memory Module (NVDIMM);
obtaining a set of non-volatile memory sensor data corresponding to a non-volatile memory located on the NVDIMM;
analyzing the set of volatile memory sensor data and the set of non-volatile memory sensor data, the analyzing including:
comparing the set of volatile memory sensor data to a set of volatile memory thresholds; and
comparing the set of non-volatile memory sensor data to a set of non-volatile memory thresholds;
determining, based on the analyzing, that a memory condition exists, the determining including:
determining, in response to the set of non-volatile memory sensor data not satisfying the set of non-volatile memory thresholds, that a non-volatile memory condition exists; and
issuing, in response to determining that the memory condition exists, one or more memory actions, the issuing including:
transferring, in response to determining that the non-volatile memory condition exists, a portion of the non-volatile memory to the volatile memory.

10. The method of claim 9, wherein the set of volatile memory sensor data and the set of non-volatile memory sensor data each include:
a set of thermal data;
a set of voltage data; and
a set of humidity data.

11. The method of claim 9, wherein:
determining that the memory condition exists further comprises:
determining, in response to the set of volatile memory sensor data not satisfying the set of volatile memory thresholds, that a volatile memory condition exists; and
issuing the one or more memory actions further comprises:
generating, in response to determining that the volatile memory condition exists, a set of parity volatile memory data;
storing the set of parity volatile memory data in the non-volatile memory; and
reducing a refresh rate of the volatile memory.

12. The method of claim 11, further comprising:
comparing the set of parity volatile memory data to memory stored in the volatile memory;
determining that the memory stored in the volatile memory is corrupt based on the comparison between the set of parity volatile memory data and the memory stored in the volatile memory; and
correcting, based on determining that the memory stored in the volatile memory is corrupt, the memory stored in the volatile memory such that the memory stored in the volatile memory corresponds to the parity volatile memory data.

13. The method of claim 9, wherein issuing the one or more memory actions further comprises:
altering, in response to determining that the non-volatile memory condition exists, a read and write frequency of the non-volatile memory.

14. The method of claim 9, wherein:
determining that the memory condition exists further comprises:
determining, in response to the set of volatile memory sensor data not satisfying the set of volatile memory thresholds, that a volatile memory condition exists; and
issuing the one or more memory actions further comprises:
backing-up, in response to determining that the volatile memory condition exists, the volatile memory; and
reducing a scrub rate of the volatile memory.

15. A computer program product comprising a computer readable storage medium having program instructions embodied therewith, the program instructions executable by one or more processing circuits to cause the one or more processing circuits to perform a method comprising:
obtaining a set of volatile memory sensor data corresponding to a volatile memory located on a Non-Volatile Dual In-Line Memory Module (NVDIMM);
obtaining a set of non-volatile memory sensor data corresponding to a non-volatile memory located on the NVDIMM;
analyzing the set of volatile memory sensor data and the set of non-volatile memory sensor data, the analyzing including:
comparing the set of volatile memory sensor data to a set of volatile memory thresholds; and
comparing the set of non-volatile memory sensor data to a set of non-volatile memory thresholds;
determining, based on the analyzing, that a memory condition exists, the determining including:
determining, in response to the set of non-volatile memory sensor data not satisfying the set of non-volatile memory thresholds, that a non-volatile memory condition exists; and
issuing, in response to determining that the memory condition exists, one or more memory actions, the issuing including:
transferring, in response to determining that the non-volatile memory condition exists, a portion of the non-volatile memory to the volatile memory.

16. The computer program product of claim 15, wherein obtaining the set of volatile memory sensor data is based on a rate of change of the volatile memory sensor data, and wherein obtaining the set of non-volatile memory sensor data is based on a rate of change of the non-volatile memory sensor data.

17. The computer program product of claim 15, wherein:
determining that the memory condition exists further comprises:
determining, in response to the set of volatile memory sensor data not satisfying the set of volatile memory thresholds, that a volatile memory condition exists; and
issuing the one or more memory actions further comprises:
copying, in response to determining that the volatile memory condition exists, the volatile memory to the non-volatile memory; and
altering, in response to copying the volatile memory to the non-volatile memory, a power provided to the volatile memory.

18. The computer program product of claim 15, wherein:
determining that the memory condition exists further comprises:
determining, in response to the set of volatile memory sensor data not satisfying the set of volatile memory thresholds, that a volatile memory condition exists; and
issuing the one or more memory actions further comprises:
transferring, in response to determining that the volatile memory condition exists, data located in the volatile memory to the non-volatile memory; and
reading the transferred data from the non-volatile memory.

* * * * *